United States Patent [19]

Schilling et al.

[11] 4,172,273

[45] Oct. 23, 1979

[54] MULTIPLE FLASH UNIT WITH LIGHT-SPREADING PROTECTIVE SHIELD

[75] Inventors: Werner Schilling, Heidenheim; Hans Reiber, Augsburg, both of Fed. Rep. of Germany

[73] Assignee: Patent-Treuhand-Gesellschaft für elektrische Glühlampen mbH, Munich, Fed. Rep. of Germany

[21] Appl. No.: 857,243

[22] Filed: Dec. 5, 1977

[30] Foreign Application Priority Data

Dec. 6, 1976 [DE] Fed. Rep. of Germany ....... 2655240

[51] Int. Cl.[2] .............................................. G03B 15/02

[52] U.S. Cl. ...................................... 362/13; 362/328; 362/339; 362/17

[58] Field of Search ........................ 362/11, 13, 17, 16, 362/311, 18, 328, 339

[56] References Cited

U.S. PATENT DOCUMENTS 4,085,316 4/1978 Quinn .................................... 362/16

*Primary Examiner*—Stephen J. Lechert, Jr.

*Attorney, Agent, or Firm*—Frishauf, Holtz, Goodman & Woodward

[57] ABSTRACT

A prismatic protective shield for each flash-lamp and reflector combination has arrays of parallel prisms in order to level the light distribution with a tendency to produce an intensity dip at the pattern center. Arrays of horizontal prisms occupy a central vertical stripe of the shield plane. Arrays of vertical prisms are at each side of the horizontal prisms.

7 Claims, 15 Drawing Figures

MULTIPLE FLASH UNIT WITH LIGHT-SPREADING PROTECTIVE SHIELD

This invention relates to a multiple flash unit comprising several combustion type photoflash lamps disposed on a carrier designed for use with a camera, with their associated reflectors, means for igniting the lamps, and a radiation-transparent protective shield which covers the reflector-lamp assembly. Multiflash units of this type are known under the tradenames "Flashcube", "FlipFlash" and "TopFlash".

BACKGROUND AND PRIOR ART

Pictures produced by the instant-development method and taken from a scene which has been illuminated by such multiflash units, exhibit a bright center and dark border zones. Instantly developed color pictures may additionally exhibit a color shift.

The film material used in instant-development picture-taking differs from the material conventionally used in picture-taking by its highly reduced exposure tolerance. In order to obtain an instantly developed picture of satisfactory quality, it is therefore vitally important to provide uniform scene illumination. The heretofore available multiflash units are not yet adequate in this regard, for they furnish a light distribution curve with a distinct and prominent maximum in the region of the reflector axis, and a falling off towards the side zones of the reflector due to the protective shield covering the reflector-lamp assembly, which heretofore has generally been transparent in the area immediately covering the lamp. On account of the nature of instant-picture film, it would be desirable to provide a rise of the light distribution at the lateral borders with concurrent lowering of the central maximum to the level at the border. A light distribution curve even with a dip in the center would be particularly advantageous.

THE PRESENT INVENTION

It is the object of the present invention to devise a multiflash unit of the aforesaid type which provides a levelled light distribution curve with a tendency to form a center dip and which is thereby useful for scene lighting in instant-picture taking.

Briefly, the protective shield of such a multiflash unit is provided with a systematic thickness variation pattern over each area covering a reflector-lamp assembly to bring about the desired light distribution—in cooperation with the reflector associated with the lamp. Although the systematic thickness variation pattern could to some advantage be of drum lens or Fresnel lens shape, it is preferably of prismatic configuration and may internally or externally be formed integral with the protective shield. Preferably, prisms are provided which are formed integrally with the inner surface of the protective shield.

DRAWINGS, ILLUSTRATING EXAMPLES

Figure 1:
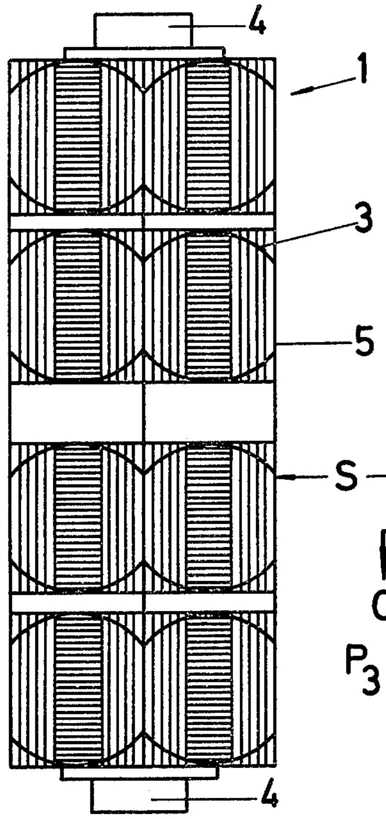
FIG. 1 is a front view of a multiflash unit in "FlipFlash" configuration with a prismatic protective shield in fields S covering the respective reflector-lamp assemblies.

The multiflash unit 1 (FIG. 1) in the well-known "FlipFlash" kind of array incorporates two groups of lamps each consisting of four combustion type photoflash lamps 2 (FIGS. 3, 4) with associated reflectors 3. The lamps are ignitable by a high voltage pulse. The unit is equipped with devices for igniting the lamps, for indicating used-up lamps, and for checking the ignition-readiness of a succeeding lamp. Each group of lamps is connected to a plug type base 4. The association of lamp group to base is such that at all times only the lamps of the group remote from the lens can be flashed by the camera. Reflectors and lamps of the multiflash unit are covered with a radiation-transmissive plastic protective shield 5. Each of the fields S of the protective shield 5 covering a reflector-lamp assembly has four repetitive arrays $P_1$, $P_2$, $P_3$, $P_4$, of parallel similar prisms (FIG. 2); there are two vertical and two horizontal prism arrays.

Figure 5:
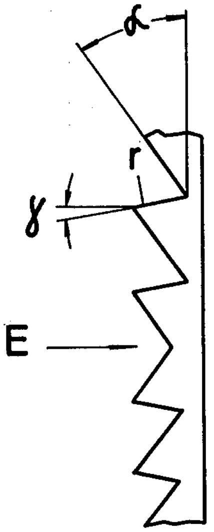
FIG. 5 is a detail of the region E of FIG. 3.
Figure 6:
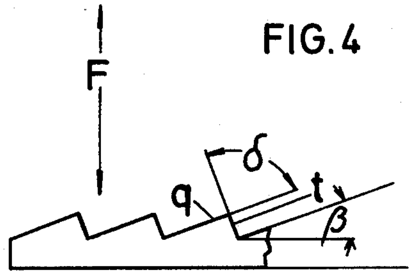
FIG. 6 is a detail of the region F of FIG. 4.

The vertical prism arrays $P_1$ and $P_2$ are symmetrically offset from the vertical center line A-B by the distance b/2 and have vertical refractive prism edges. The angle of refraction $\beta$ of the prism faces is 20° (FIG. 6). The horizontal prism arrays $P_3$ and $P_4$ have their refractive edges parallel with the horizontal center line C-D, which is the boundary between these two arrays relative to which they extend symmetrically—entirely filling the area between the arrays $P_1$ and $P_2$. As shown in FIG. 5, the refractive angle $\alpha$ of the prism faces of the prism arrays $P_3$ and $P_4$ is 36°. While the vertical prism arrays $P_1$ and $P_2$ almost cover the reflector themselves, the lamp is positioned directly adjacent to the horizontal prism arrays $P_3$ and $P_4$. The light reflected from the lamp in the direction of picture taking is spread by the horizontal prisms to a large extend upwards and downwards and a lateral spread is effected by the vertical prisms of the arrays $P_1$ and $P_2$, particularly for the light reflected back by the reflector. The number of prisms, their position and refractive angle are dimensioned so as to furnish the desired light distribution curve in the direction of picture taking. The vertical prism arrays, in the illustrated case, have four prisms each. The horizontal prism arrays shown have thirteen horizontal prisms each. The height h is 25–28 mm, the sectional lengths of a,b,c are 6 mm, 7 mm, 6. Side r (FIG. 5) includes an angle $\gamma$ of 10° with the horizontal. The sides q and t include an angle $\delta$ of 90°. Vertical and horizontal prism arrays for producing instantly developed pictures free of shades and color shift are also feasible when using the "Flashcube" (FIGS. 7–12) or the "TopFlash" configuration. Alternately, prism configurations shown in FIGS. 13–15 may be used for modifying the protective shield to spread the light in accordance with the invention.

Figure 2:
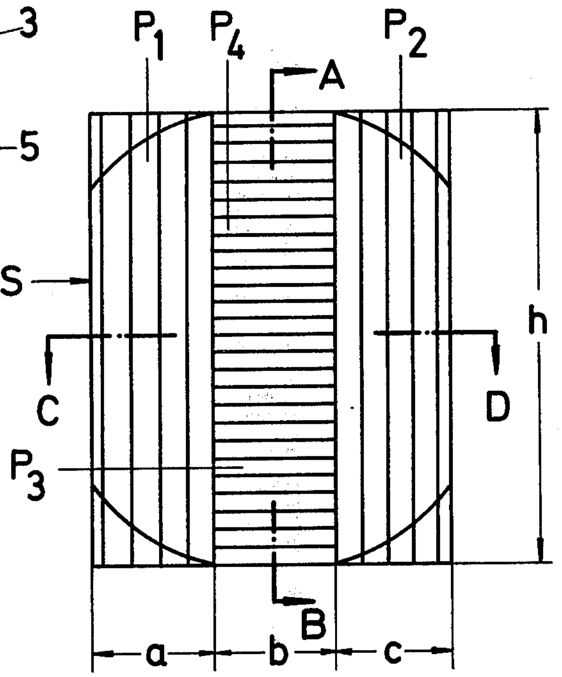
FIG. 2 is a magnified front view of one of the fields S of the protective shield of the multiflash unit of FIG. 1.
Figure 3:
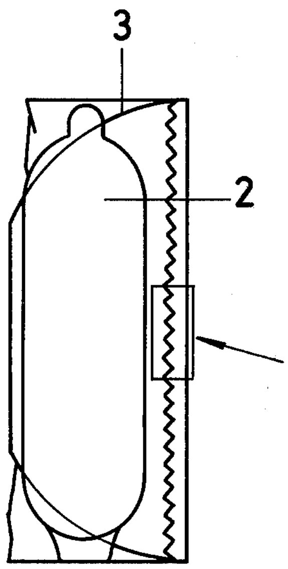
FIG. 3 is a section along line A-B of FIG. 2.
Figure 4:
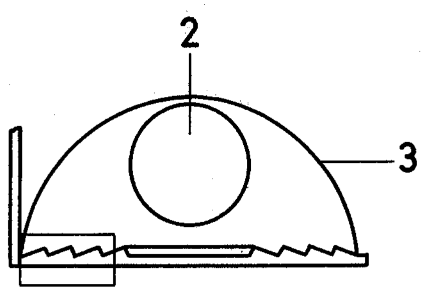
FIG. 4 is a section along line C-D of FIG. 2.
Figure 7:
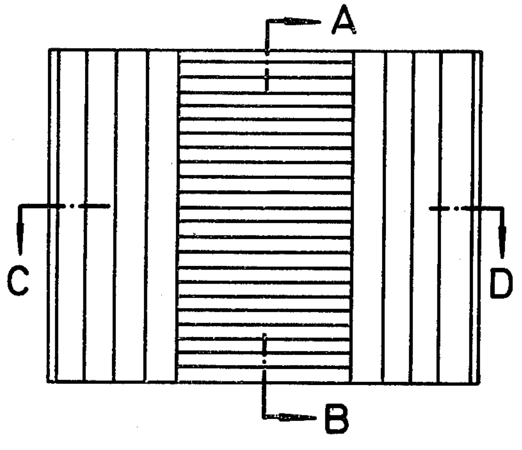
FIG. 7 is a front view of one of the four faces of a multiflash unit in "Flashcube" configuration provided with a prismatic protective shield.
Figure 9:
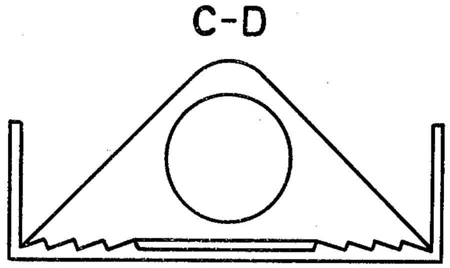
FIG. 9 is a section along the line C-D of FIG. 7.

To return to the "Flashcube" configuration, FIG. 9 clearly shows, by comparison with FIG. 4, that the configuration of the vertical prisms in the shield shown in front view in FIG. 7 is the same as that of the prisms of the arrays $P_1$ and $P_2$ of FIG. 2.

Figure 8:
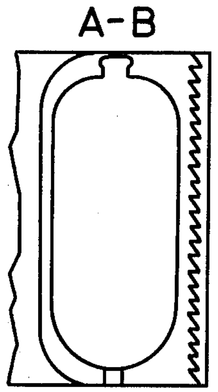
FIG. 8 is a section of the same along the line A-B of FIG. 7.
Figure 10:
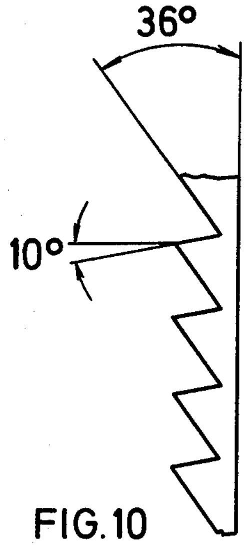
FIG. 10 is a magnified detail of part of the righthand portion of FIG. 8.
Figure 11:
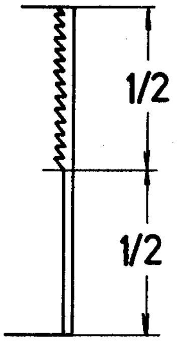
FIGS. 11 and 12 show different modifications of horizontal prism arrangements.
Figure 12:
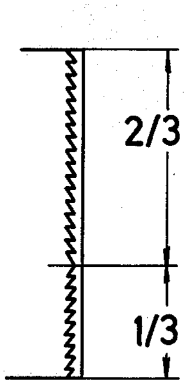

The horizontal prisms of FIG. 7 are shown in FIG. 8. FIG. 10 shows the profile of the horizontal prisms of FIG. 8. FIG. 11 is showing a variation in which the bottom array of horizontal prisms is left out. FIG. 12 is showing an arrangement in which the bottom array of horizontal prisms has a vertical dimension that is only half that of the top array.

Figure 13:
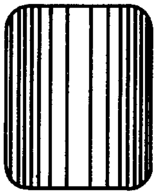
FIGS. 13, 14 and 15 are front views of different patterns of prismatic protective shields for lamp-reflector combinations of a multiflash unit.
Figure 14:
Figure 15:

The pattern of FIG. 13 spreads light laterally but not vertically, and FIGS. 14 and 15 spread the light in two mutually perpendicular diagonal directions. It will thus be seen that a number of variations are possible within the inventive concept.

Reference has been made to vertical prisms and horizontal prisms. It must be understood that these references refer to the normal position of the camera in which the longer dimension of the picture is horizontal. It is to be understood that when a picture with a longer vertical dimension is to be taken, the camera will be rotated so that the framing of the picture is vertical in the viewfinder. Then, of course, the prisms provided according to the present invention on the protective shield of the flashcubes will still provide their spreading effect.

We claim:

1. A multiple flash unit suitable for instantdevelopment photography by direct flash illumination, comprising a plurality of combustion-type flash lamps each provided with a reflector and all held on a carrier capable of being mounted on a camera, in which unit the improvement is incorporated which consists in that:

a protective transparent shield of prismatically varying thickness having arrays of light-spreading oblique refraction surfaces is provided in front of each lamp-and-reflector combination for producing, in combination with the reflector of the lamp-and-reflector combination, a light distribution over a picture-taking pyramidal angle of view which is less in the central direction and increases, at least in the mid-portion of said pyramidal angle, as the angle of radiation deviates from the central direction towards the boundaries of said angle of view.

2. A multiple flash unit as defined in claim 1, in which said arrays of light-spreading oblique refraction surfaces of said protective shield are arrays of juxtaposed parallel prisms at least one pair of said arrays having their directions of parallelism respectively in each of two mutually perpendicular directions.

3. A multiple flash unit as defined in claim 2, in which at least one of said parallel prism arrays have an array of normally horizontally disposed prisms and at least one of said parallel prism arrays is an array of normally vertically disposed prisms.

4. A multiple flash unit as defined in claim 2, in which said parallel prism arrays consist of two arrays of horizontal prisms disposed one above the other and together occupying a central vertical stripe of said protective shield and two of said parallel prism arrays are arrays of vertical prisms, each at one side of said vertical stripe occupied by said arrays of horizontal prisms with all prisms having a light-spreading configuration.

5. A multiple flash unit as defined in claim 4, in which said pair of arrays of horizontal prisms and also said pair of arrays of vertical prisms are disposed symmetrically with respect to the center of the protective shield provided in front of an individual lamp-and-reflector combination.

6. A multiple flash unit as defined in claim 5 in which said arrays of horizontal prisms have refractive surfaces at a refractive angle ($\alpha$) of about 36° and a ridge angle of about 64° and said arrays of verticle prisms have refractive surfaces at a refractive angle ($\beta$) of about 20° and a ridge angle ($\delta$) of about 90°.

7. A multiple flash unit as defined in claim 5 in which the ratio of the width of said central vertical stripe to the width of each array of vertical prisms is approximately to 7:6.

* * * * *